United States Patent
Tian et al.

(10) Patent No.: US 11,703,916 B2
(45) Date of Patent: Jul. 18, 2023

(54) HINGE MECHANISM AND FOLDABLE ELECTRONIC DEVICE

(71) Applicant: Huawei Technologies Co., Ltd., Shenzhen (CN)

(72) Inventors: Haiqiang Tian, Dongguan (CN); Weifeng Wu, Shenzhen (CN); Tao Huang, Dongguan (CN); Li Liao, Dongguan (CN); Feng Zhao, Shanghai (CN); Gang Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/514,596

(22) Filed: Oct. 29, 2021

(65) Prior Publication Data
US 2022/0137676 A1    May 5, 2022

(30) Foreign Application Priority Data

Oct. 31, 2020   (CN) .......................... 202011198925.3

(51) Int. Cl.
G06F 1/16       (2006.01)
G09F 9/30       (2006.01)

(52) U.S. Cl.
CPC .......... *G06F 1/1681* (2013.01); *G06F 1/1652* (2013.01); *G09F 9/301* (2013.01)

(58) Field of Classification Search
CPC combination set(s) only.
See application file for complete search history.

(56) References Cited

U.S. PATENT DOCUMENTS

| | | |
|---|---|---|
| 9,021,657 B2 | 5/2015 | Park et al. |
| 9,348,450 B1 | 5/2016 | Kim |
| 9,677,308 B1 | 6/2017 | Chen et al. |
| 10,036,188 B1 | 7/2018 | Yao et al. |
| 10,231,347 B2 | 3/2019 | Seo et al. |
| 10,469,635 B1 | 11/2019 | Carlson et al. |
| 10,487,550 B2 | 11/2019 | Chu |
| 10,845,850 B1 | 11/2020 | Kang et al. |
| 11,231,754 B2 | 1/2022 | Kang et al. |
| 11,467,633 B2 | 10/2022 | Liao et al. |
| 2005/0236869 A1 | 10/2005 | Ka |
| 2007/0129609 A1 | 6/2007 | Kawasaki |
| 2010/0232100 A1 | 9/2010 | Fukuma et al. |
| 2012/0307423 A1 | 12/2012 | Bohn et al. |

(Continued)

FOREIGN PATENT DOCUMENTS

| | | |
|---|---|---|
| CN | 1681380 A | 10/2005 |
| CN | 101840247 A | 9/2010 |

(Continued)

*Primary Examiner* — Lisa Lea-Edmonds
(74) *Attorney, Agent, or Firm* — Conley Rose, P.C.

(57) ABSTRACT

A hinge mechanism includes a first lap joint structure disposed on one end of each linkage component rotatably connected to a base, and extends in a direction from one end of the base to a mounting bracket located on a same side as the first lap joint structure, and a second lap joint structure disposed on one side of each support plate and that faces the base and extends in a direction from the side of the support plate to the base, wherein a second surface of the second lap joint structure slides along a surface of the first lap joint structure when two mounting brackets are relatively folded or unfolded.

20 Claims, 8 Drawing Sheets

(56) References Cited

U.S. PATENT DOCUMENTS

| | | |
|---|---|---|
| 2013/0152342 A1 | 6/2013 | Ahn et al. |
| 2014/0217875 A1 | 8/2014 | Park et al. |
| 2015/0233162 A1 | 8/2015 | Lee et al. |
| 2016/0116944 A1 | 4/2016 | Lee et al. |
| 2016/0302314 A1 | 10/2016 | Bae et al. |
| 2016/0357052 A1 | 12/2016 | Kim et al. |
| 2017/0142240 A1 | 5/2017 | Xu |
| 2017/0365197 A1 | 12/2017 | Kim et al. |
| 2018/0024589 A1 | 1/2018 | Nakamura et al. |
| 2018/0049329 A1 | 2/2018 | Seo et al. |
| 2018/0267574 A1 | 9/2018 | Cho et al. |
| 2018/0347245 A1 | 12/2018 | Chu |
| 2019/0075669 A1 | 3/2019 | Heng |
| 2019/0163241 A1 | 5/2019 | Moon et al. |
| 2019/0196543 A1 | 6/2019 | Mizoguchi et al. |
| 2019/0207141 A1 | 7/2019 | Kim et al. |
| 2019/0268456 A1 | 8/2019 | Park et al. |
| 2019/0286195 A1 | 9/2019 | Lin et al. |
| 2019/0390703 A1 | 12/2019 | Hsu |
| 2020/0097051 A1* | 3/2020 | Liu ............ G06F 1/1652 |
| 2020/0267851 A1 | 8/2020 | Hou et al. |
| 2020/0272200 A1 | 8/2020 | Hou et al. |
| 2020/0341509 A1 | 10/2020 | Wu et al. |
| 2020/0348732 A1 | 11/2020 | Kang et al. |
| 2020/0409422 A1 | 12/2020 | Wang et al. |
| 2021/0041921 A1 | 2/2021 | Kang et al. |
| 2021/0181808 A1* | 6/2021 | Liao ............ G06F 1/1641 |
| 2021/0216104 A1 | 7/2021 | Huang et al. |
| 2021/0267077 A1 | 8/2021 | Zhang et al. |
| 2021/0336160 A1 | 10/2021 | Jiang |
| 2021/0355988 A1 | 11/2021 | Cheng et al. |
| 2021/0373612 A1 | 12/2021 | Hwang et al. |
| 2022/0011828 A1* | 1/2022 | Zhan ............ G06F 1/1616 |
| 2022/0104370 A1* | 3/2022 | Wu ............ H05K 5/0217 |
| 2022/0113770 A1 | 4/2022 | Kang et al. |
| 2022/0132679 A1 | 4/2022 | Han |
| 2022/0137676 A1* | 5/2022 | Tian ............ G06F 1/1652 |
| | | 361/679.27 |
| 2022/0217859 A1 | 7/2022 | Lee et al. |
| 2022/0303371 A1* | 9/2022 | Liao ............ H04M 1/0268 |
| 2022/0377919 A1 | 11/2022 | Zhang et al. |

FOREIGN PATENT DOCUMENTS

| | | |
|---|---|---|
| CN | 103167071 A | 6/2013 |
| CN | 104836865 A | 8/2015 |
| CN | 105096752 A | 11/2015 |
| CN | 105491193 A | 4/2016 |
| CN | 205750631 U | 11/2016 |
| CN | 205881905 U | 1/2017 |
| CN | 106601130 A | 4/2017 |
| CN | 107632661 A | 1/2018 |
| CN | 207010739 U | 2/2018 |
| CN | 207115888 U | 3/2018 |
| CN | 108173995 A | 6/2018 |
| CN | 108665812 A | 10/2018 |
| CN | 108712535 A | 10/2018 |
| CN | 109032251 A | 12/2018 |
| CN | 109118964 A | 1/2019 |
| CN | 109257460 A | 1/2019 |
| CN | 208421695 U | 1/2019 |
| CN | 208596323 U | 3/2019 |
| CN | 208622359 U | 3/2019 |
| CN | 109658826 A | 4/2019 |
| CN | 109686267 A | 4/2019 |
| CN | 208689844 U | 4/2019 |
| CN | 109830185 A | 5/2019 |
| CN | 208922657 U | 5/2019 |
| CN | 109859630 A | 6/2019 |
| CN | 109979328 A | 7/2019 |
| CN | 110007715 A | 7/2019 |
| CN | 110010008 A | 7/2019 |
| CN | 110022386 A | 7/2019 |
| CN | 110058444 A | 7/2019 |
| CN | 110061039 A | 7/2019 |
| CN | 110166591 A | 8/2019 |
| CN | 110189638 A | 8/2019 |
| CN | 110265438 A | 9/2019 |
| CN | 209358590 U | 9/2019 |
| CN | 209375705 U | 9/2019 |
| CN | 209414382 U | 9/2019 |
| CN | 209430596 U | 9/2019 |
| CN | 209545628 U | 10/2019 |
| CN | 110445913 A | 11/2019 |
| CN | 209593488 U | 11/2019 |
| CN | 110552953 A | 12/2019 |
| CN | 110557481 A | 12/2019 |
| CN | 110580854 A | 12/2019 |
| CN | 209724948 U | 12/2019 |
| CN | 209731301 U | 12/2019 |
| CN | 209860956 U | 12/2019 |
| CN | 110671423 A | 1/2020 |
| CN | 110853510 A | 2/2020 |
| CN | 110985524 A | 4/2020 |
| CN | 110992833 A | 4/2020 |
| CN | 111327739 A | 6/2020 |
| CN | 210799707 U | 6/2020 |
| CN | 111615277 A | 9/2020 |
| CN | 111653202 A | 9/2020 |
| CN | 111677747 A | 9/2020 |
| CN | 113053238 A | 6/2021 |
| EP | 3109847 A1 | 1/2015 |
| EP | 3109847 A1 | 12/2016 |
| KR | 101487189 B1 | 1/2015 |
| KR | 20160089164 A | 7/2016 |
| KR | 102007426 B1 | 8/2019 |
| KR | 102152040 B1 | 9/2020 |
| RU | 2596469 C2 | 9/2016 |
| RU | 2683290 C2 | 3/2019 |
| WO | 2015126068 A1 | 8/2015 |
| WO | 2017160680 A1 | 9/2017 |
| WO | 2018070778 A1 | 4/2018 |
| WO | 2018082338 A1 | 5/2018 |
| WO | 2019151839 A1 | 8/2019 |
| WO | 2019223009 A1 | 11/2019 |
| WO | 2019227296 A1 | 12/2019 |
| WO | 2020057032 A1 | 3/2020 |

* cited by examiner

HINGE MECHANISM AND FOLDABLE ELECTRONIC DEVICE

CROSS-REFERENCE TO RELATED DISCLOSURES

This application claims priority to Chinese Patent Application No. 202011198925.3 filed on Oct. 31, 2020, which is hereby incorporated by reference in its entirety.

TECHNICAL FIELD

This application relates to the field of terminal technologies, and in particular, to a hinge mechanism and a foldable electronic device.

BACKGROUND

Foldable electronic devices such as a mobile phone and a computer become inseparable from our lives, can be found everywhere in daily life, and greatly improve people's living standards. With rapid development of a communication device technology, a display effect of a display of a mobile terminal such as a mobile phone is gaining more attention. However, a volume of the mobile phone restricts expansion of a size of the display.

To implement a relatively large area of a display on a relatively small mobile phone, the mobile phone may use a foldable structure. The foldable mobile phone generally includes two housings. The two housings are connected by using a hinge mechanism, so that the two housings can relatively rotate to relatively fold or unfold the two housings. To better support a flexible display, and ensure that the flexible display is not excessively stretched and extruded when being folded and when in a folded state, the hinge mechanism usually includes a base and two support plates. The two support plates form a display accommodating space. The two housings are respectively fastened to the base by using mounting brackets. The two support plates are hinged to the mounting brackets and can relatively rotate around the mounting brackets. In addition, the flexible display covers all of the two housings and the hinge mechanism. In a folding process, the two housings drive the support plates to rotate simultaneously, to enable the display to switch from an unfolded state to a folded state.

However, in the foregoing foldable electronic device, the support plates likely shake and stability of moving tracks of the support plates cannot be ensured.

SUMMARY

Embodiments of this application provide a hinge mechanism and a foldable electronic device. In an unfolding process or a folding process, support plates can be prevented from shaking, thereby ensuring stability of moving tracks.

According to a first aspect, an embodiment of this application provides a hinge mechanism including a base, and two mounting brackets, two support plates, and two linkage components that are symmetrically disposed relative to the base, where each mounting bracket is rotatably connected to the support plate located on a same side, one end of each linkage component is rotatably connected to the base, and the other end of the linkage component is connected to the mounting bracket located on a same side, to enable the two mounting brackets to be relatively folded and unfolded, a first lap joint structure is disposed on one end that is of each linkage component and that is rotatably connected to the base, and the first lap joint structure extends in a direction from one end of the base to the mounting bracket located on a same side as the first lap joint structure, a second lap joint structure is disposed on one side that is of each support plate and that faces the base, and the second lap joint structure extends in a direction from the side of the support plate to the base, and the second lap joint structure has a first surface and a second surface opposite to the first surface, the first surface is close to a flexible display, and in a process in which the two mounting brackets are relatively folded or unfolded, the second surface of the second lap joint structure slides along a surface of the first lap joint structure.

In the hinge mechanism provided in this embodiment of this application, each mounting bracket is rotatably connected to the support plate located on the same side, one end of each linkage component is rotatably connected to the base, and the other end of the linkage component is connected to the mounting bracket located on the same side, so that the two mounting brackets can be relatively folded and unfolded. The first lap joint structure is disposed on one end that is of each linkage component and that is rotatably connected to the base, and the first lap joint structure extends in the direction from one end of the base to the mounting bracket located on the same side as the first lap joint structure, and the second lap joint structure is disposed on one side that is of each support plate and that faces the base, and the second lap joint structure extends in the direction from the side of the support plate to the base. As such, in the process in which the two mounting brackets are relatively folded or unfolded, the second surface of the second lap joint structure slides along the surface of the first lap joint structure. In this way, in a process in which the hinge mechanism is unfolded, the support plate is raised, and the second lap joint structure and the first lap joint structure relatively slide and are gradually raised, until the hinge mechanism is opened. Therefore, the foregoing setting can precisely control a moving track of the support plate, to prevent the hinge mechanism from shaking in a motion process.

In a possible implementation, a third lap joint structure is disposed on one side that is of the base and that faces each support plate. When the two mounting brackets are relatively unfolded into an open state, a surface that is of the second lap joint structure of each support plate and that faces a same direction as the second surface abuts against the third lap joint structure located on a same side.

The second lap joint structure on each support plate abuts against the third lap joint structure on the base, so that extrusion force borne by the support plate in a vertical direction can be transmitted to the base. Therefore, a problem that the support plate is deformed due to the extrusion force can be alleviated, and the extrusion force can be increased to improve an anti-extrusion capability of the hinge mechanism in an open state.

In a possible implementation, the surface that is of the first lap joint structure and that is in contact with the second lap joint structure is an arc surface, or the second surface that is of the second lap joint structure and that is in contact with the first lap joint structure is an arc surface, or both the surface that is of the first lap joint structure and that is in contact with the second lap joint structure and the second surface that is of the second lap joint structure and that is in contact with the first lap joint structure are arc surfaces.

When the surface that is of the first lap joint structure and that is in contact with the second lap joint structure is disposed as an arc surface, or when the surface that is of the second lap joint structure and that is in contact with the first lap joint structure is disposed as an arc surface, the first lap joint structure on the linkage component and the second lap joint structure on the support plate can move more smoothly when contacting each other and relatively sliding. When both the surface that is of the first lap joint structure and that is in contact with the second lap joint structure and the surface that is of the second lap joint structure and that is in contact with the first lap joint structure are disposed as arc surfaces, the first lap joint structure on the linkage component and the second lap joint structure on the support plate can move more smoothly when contacting each other and relatively sliding.

In a possible implementation, the arc surface has at least two segments of curved surfaces, and two adjacent segments of curved surfaces in the at least two segments of curved surfaces are disposed at an included angle. The arc surface is disposed to have at least two segments of curved surfaces, and two adjacent segments of curved surfaces in the at least two segments of curved surfaces are disposed at an included angle, so that the support plate can better adapt to a moving track of the second lap joint structure when relatively sliding along the first lap joint structure.

In a possible implementation, in a process in which the two mounting brackets are relatively folded or unfolded from a first position to a second position, the second surface of the second lap joint structure slides along the surface of the first lap joint structure.

The first position and the second position are any two positions of the two mounting brackets in the relative folding or unfolding process. In other words, the first lap joint structure and the second lap joint structure may be overlapped with each other throughout the process, or may be overlapped with each other in a portion of the process. When the first lap joint structure and the second lap joint structure are overlapped with each other in the portion of the process, path overlapping between any two positions can improve motion stability of the support plate to some extent.

In a possible implementation, a chute is disposed on the support plate, and a protrusion portion is disposed on the linkage component. A first hinge pin is disposed on the protrusion portion, and the first hinge pin runs through the chute and relatively slides along an extension direction of the chute.

The chute is disposed on the support plate, the protrusion portion is disposed on the linkage component, the first hinge pin is disposed on the protrusion portion, and the first hinge pin can run through the chute and relatively slide along the extension direction of the chute, so that a relative sliding connection between the linkage component and the support plate can be implemented.

In a possible implementation, each linkage component includes: a rotary slider and an arc arm. One end of each rotary slider is rotatably connected to the base, and the other end of the rotary slider is slidably connected to the mounting bracket located on a same side. One end of each arc arm is rotatably connected to the base, and the other end of the arc arm is rotatably connected to the mounting bracket located on a same side. Each support plate is slidably connected to the rotary slider or the arc arm, and rotation axes of the rotary slider and the arc arm on the base are parallel to but do not coincide with each other.

The first lap joint structure is disposed on one end that is of at least one rotary slider and that is rotatably connected to the base, or the first lap joint structure is disposed on one end that is of at least one arc arm and that is rotatably connected to the base; or the first lap joint structure is disposed on each of one end that is of at least one rotary slider and that is rotatably connected to the base and one end that is of at least one arc arm and that is rotatably connected to the base.

One end of each rotary slider is rotatably connected to the base, and the other end of the rotary slider is slidably connected to the mounting bracket located on the same side; one end of each arc arm is rotatably connected to the base, and the other end of the arc arm is rotatably connected to the mounting bracket located on the same side, and each support plate is slidably connected to the rotary slider or the arc arm, so that the two mounting brackets can be relatively folded and unfolded. In addition, the first lap joint structure is disposed on one end that is of each rotary slider and that is rotatably connected to the base, or the first lap joint structure is disposed on one end that is of each arc arm and that is rotatably connected to the base, or the first lap joint structure is disposed on each of one end that is of each rotary slider and that is rotatably connected to the base and one end that is of each arc arm and that is rotatably connected to the base, and the second lap joint structure is disposed on one side that is of the support plate and that faces the base. As such, in the process in which the two mounting brackets are relatively folded or unfolded, the second surface of the second lap joint structure slides along the surface of the first lap joint structure. In this way, in the process in which the hinge mechanism is unfolded, the support plate is raised, and the second lap joint structure and the first lap joint structure relatively slide and are gradually raised, until the hinge mechanism is opened. Therefore, the foregoing setting can precisely control the moving track of the support plate, to prevent the hinge mechanism from shaking in the motion process.

In a possible implementation, a groove is disposed on one of the mounting bracket and the rotary slider, an extension portion is disposed on the other one of the mounting bracket and the rotary slider, and the extension portion fits the groove to implement a sliding connection between the mounting bracket and the rotary slider.

In this way, the extension portion on the rotary slider can slide in the groove on the mounting bracket, or the extension portion on the mounting bracket can slide in the groove on the rotary slider, so that a relative sliding connection between the mounting bracket and the rotary slider can be implemented.

In a possible implementation, a second hinge pin is further disposed on one of the mounting bracket and the arc arm, and a through-hole is disposed on the other one of the mounting bracket and the arc arm for the second hinge pin to pass through. The second hinge pin passes through the through-hole, to implement a rotating connection between the mounting bracket and the rotary slider.

The second hinge pin is disposed on one of the mounting bracket and the arc arm, the through-hole is disposed on the other one of the mounting bracket and the arc arm for the second hinge pin to pass through, and the second hinge pin can run through the through-hole and relatively rotate. In this way, a relative rotating connection between the arc arm and the mounting bracket can be implemented.

In a possible implementation, the support plate further has a circular arc bulge, and one side that is of the mounting bracket and that faces the support plate has a circular arc groove that matches the circular arc bulge. The circular arc bulge rotates in the circular arc groove, to implement a rotating connection between the support plate and the mounting bracket.

In this way, the circular arc bulge on the support plate can relatively rotate around the circular arc groove on the mounting bracket, and connection stability between the mounting bracket and the support plate can be ensured, to avoid relative shaking.

According to a second aspect, an embodiment of this application provides a foldable electronic device. The foldable electronic device includes at least a first housing, a second housing, and the hinge mechanism described above, where the first housing and the second housing are respectively located on two sides of the hinge mechanism, and the first housing and the second housing are respectively fastened to the mounting brackets in the hinge mechanism, and further includes a flexible display, where the flexible display is disposed on surfaces of the hinge mechanism, the first housing, and the second housing.

In the foldable electronic device provided in this embodiment of this application, the hinge mechanism is disposed in the foldable electronic device. In the hinge mechanism, each mounting bracket is rotatably connected to the support plate located on the same side, one end of each linkage component is rotatably connected to the base, and the other end of the linkage component is connected to the mounting bracket located on the same side, so that the two mounting brackets can be relatively folded and unfolded. The first lap joint structure is disposed on one end that is of each linkage component and that is rotatably connected to the base, and the first lap joint structure extends in the direction from one end of the base to the mounting bracket located on the same side as the first lap joint structure, and the second lap joint structure is disposed on one side that is of each support plate and that faces the base, and the second lap joint structure extends in the direction from the side of the support plate to the base. As such, in the process in which the two mounting brackets are relatively folded or unfolded, the second surface of the second lap joint structure slides along the surface of the first lap joint structure. In this way, in the process in which the hinge mechanism is unfolded, the support plate is raised, and the second lap joint structure and the first lap joint structure relatively slide and are gradually raised, until the hinge mechanism is opened. Therefore, the foregoing setting can precisely control the moving track of the support plate, to prevent the hinge mechanism from shaking in the motion process, thereby improving user experience.

With reference to the accompanying drawings, these and other aspects, implementation forms and advantages of the example embodiments will become apparent from the embodiments described below. It should be understood, however, that the specification and the accompanying drawings are merely intended to illustrate and are not intended to limit the embodiments of this application. For details, refer to the appended claims. Other aspects and advantages of the embodiments of this application are described in the following descriptions, and some of them are obvious from the descriptions, or are learned from practice of the embodiments of this application. In addition, aspects and advantages of the embodiments of this application may be implemented and obtained by means and combinations further noted in the appended claims.

DESCRIPTION OF REFERENCE SIGNS

100—Hinge mechanism, 200—First housing, 300—Second housing, 400—Flexible display, 10—Base, 101—Third lap joint structure, 20—Mounting bracket, 201—Groove, 202—Through-hole, 30—Support plate, 3011—First surface, 301—Second lap joint structure, 302—Chute, 303—Circular arc bulge, 40—Linkage component, 401—First lap joint structure, 402—Rotary slider, 4021—Protrusion portion, 4022—First hinge pin, 4023—Extension portion, 403—Arc arm, 4031—Second hinge pin.

DESCRIPTION OF EMBODIMENTS

The terms used in implementations of this application are merely used to explain specific embodiments of this application, but are not intended to limit this application. The following describes in detail implementations of the embodiments of this application with reference to the accompanying drawings.

Emergence of a foldable electronic device brings about a breakthrough in a display manner of an original display device. Efficiency of information interaction can be doubled by one time of simple folding. In the future, designs such as a multi-folding design and a scroll design may further completely change information interaction manners. A foldable electronic display can not only flexibly change and switch modes based on different usage scenarios, but also can provide a high display-to-body ratio and high definition. Therefore, the foldable electronic display gradually becomes a hot research topic.

Foldable electronic devices such as a mobile phone and a computer have become essential in our daily lives, and have even become part of our lives. In the foldable electronic devices such as a foldable mobile phone, a flexible display is usually folded and unfolded by folding and unfolding a hinge mechanism. The hinge mechanism is an important mechanism configured to implement folding. The foldable mobile phone includes the hinge mechanism, two housings, and a flexible display. An inward-folded foldable mobile phone is used as an example. The flexible display covers inner sides of the two housings, and the two housings are connected by using the hinge mechanism. The hinge mechanism is configured to enable the two housings to relatively rotate, so that the two housings can be relatively folded or unfolded. In other words, the foldable electronic device can be folded or unfolded.

To better support the flexible display and ensure that the flexible display is not excessively stretched and extruded in a folding process, when the hinge mechanism is designed, it is necessary to consider leaving a display accommodating space for the flexible display when the flexible display is folded inward, so as to prevent the flexible display from being damaged when being directly folded. In a design, the hinge mechanism may include a base, and two mounting brackets, two support plates, and two linkage components that are distributed on two sides of the base. The two mounting brackets are fastened to the housings on two sides. The two linkage components are rotatably connected to the base and are connected to the mounting brackets, to implement a function of driving the housings on the two sides to be relatively folded and unfolded. The two support plates may relatively rotate or slide with the mounting brackets and the linkage components that are located on same sides, and form the display accommodating space when in a folded state, so that the flexible display can be accommodated in the display accommodating space after being folded inward, thereby avoiding extrusion.

Further, when the housings on the two sides rotate close to each other to be relatively folded, one end that is of one support plate and that is far away from the base and one end that is of the other support plate and that is far away from the base are close to each other. When reaching the folded state, the two support plates and the base together form the display accommodating space. In this case, the flexible display of the foldable mobile phone is accommodated in the display accommodating space in a triangle-like or droplet-like form.

When the housings on the two sides rotate away from each other to be relatively unfolded, one end that is of one support plate and that is far away from the base and one end that is of the other support plate and that is far away from the base are far away from each other, and the other ends that are of the two support plates and that are close to the base are close to each other. When reaching an unfolded state, the two support plates and the base together form a flat support plane. In this case, the flexible display of the foldable mobile phone covers the flat support plane formed by the support plates and the base.

In the foregoing design of the hinge mechanism, because there is a gap between parts, for example, there is a gap between the base and the support plate or there is a gap between the support plate and the housing, some problems such as shaking of the support plate and an uncertain moving track of the support plate may be caused. Consequently, when the two support plates in the hinge mechanism drive the two housings to be unfolded, shaking likely occurs, and stability of the moving track of the support plate cannot be ensured.

Based on the foregoing technical problems, embodiments of this application provide a hinge mechanism and a foldable electronic device. The hinge mechanism includes a base, and two mounting brackets, two support plates, and two linkage components that are symmetrically disposed relative to the base. Each mounting bracket is rotatably connected to the support plate located on a same side, one end of each linkage component is rotatably connected to the base, and the other end of the linkage component is connected to the mounting bracket located on a same side, so that the two mounting brackets can be relatively folded and unfolded. Then, a first lap joint structure is disposed on one end that is of each linkage component and that is rotatably connected to the base, and the first lap joint structure extends in a direction from one end of the base to the mounting bracket located on a same side as the first lap joint structure; and a second lap joint structure is disposed on one side that is of each support plate and that faces the base, and the second lap joint structure extends in a direction from the side of the support plate to the base. As such, in a process in which the two mounting brackets are relatively folded or unfolded, a second surface (the second lap joint structure has a first surface and the second surface opposite to the first surface, where the first surface is close to a flexible display) of the second lap joint structure slides along a surface of the first lap joint structure. In this way, in a process in which the hinge mechanism is unfolded, the support plate is raised, and the second lap joint structure and the first lap joint structure relatively slide and are gradually raised, until the hinge mechanism is opened. Therefore, the foregoing setting can precisely control a moving track of the support plate, to prevent the hinge mechanism from shaking in a motion process.

The foldable electronic device provided in the embodiments of this application may include but is not limited to a foldable fixed terminal or mobile terminal such as a mobile phone, a tablet computer, a notebook computer, an ultra-mobile personal computer (UMPC), a handheld computer, a touch television, a walkie-talkie, a netbook, a point-of-sale (POS) terminal, a personal digital assistant (PDA), a wearable device, or a virtual reality device.

The following describes in detail the hinge mechanism and the foldable electronic device provided in the embodiments of this application by using an example in which the foldable electronic device is a foldable phone.

Figure 1:
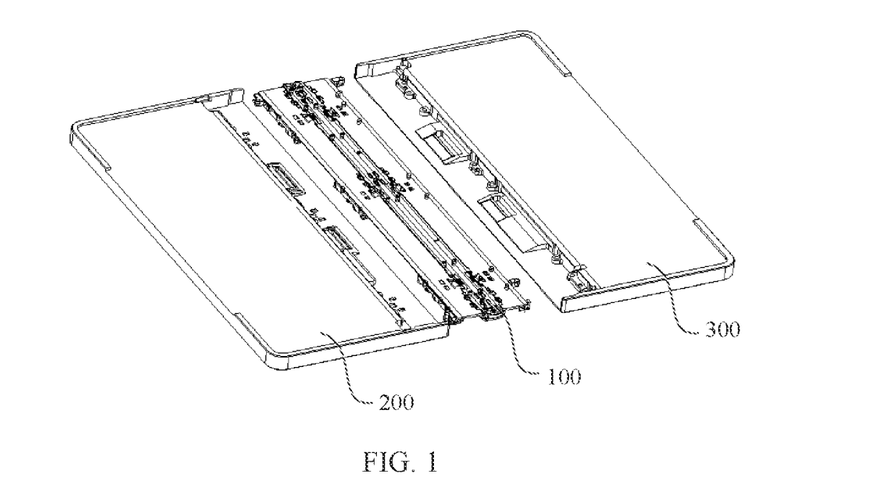
FIG. 1 is a schematic structural diagram of a foldable electronic device according to an embodiment of this application.
Figure 2:
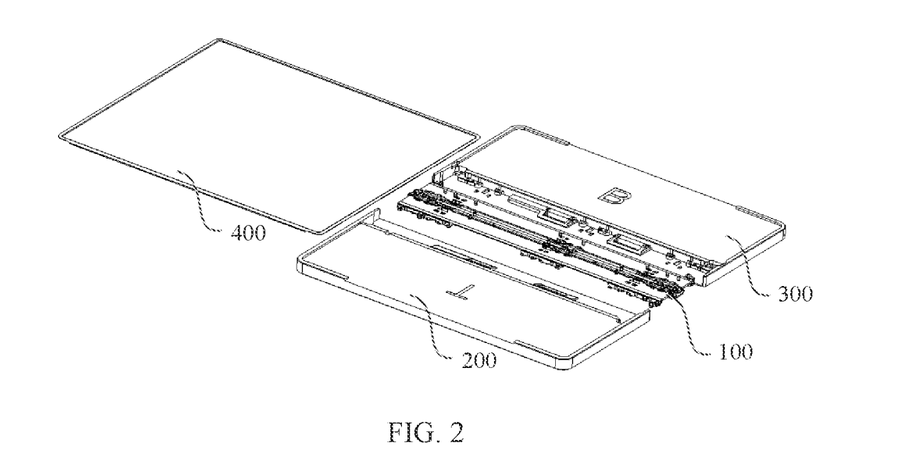
FIG. 2 is another schematic structural diagram of a foldable electronic device according to an embodiment of this application.

Referring to FIG. 1 and FIG. 2, the foldable phone may include at least a first housing 200, a second housing 300, and a hinge mechanism 100, where the first housing 200 and the second housing 300 are respectively located on two sides of the hinge mechanism 100, and the first housing 200 and the second housing 300 are separately fastened to the hinge mechanism 100. Further, the first housing 200 and the second housing 300 are respectively fastened to mounting brackets 20 in the hinge mechanism 100.

It should be noted that, the first housing 200 and the second housing 300 may be respectively fastened to the mounting brackets 20 in a welding, bonding, screw locking manner, or the like.

When the first housing 200 and the second housing 300 rotate close to each other to overlap with each other, the foldable phone is in a folded state. Otherwise, when the first housing 200 and the second housing 300 rotate away from each other from a state in which the first housing 200 and the second housing 300 are overlapped with each other to a state in which the first housing 200 and the second housing 300 cannot rotate (for example, the first housing 200 and the second housing 300 are located on a same plane), the foldable phone is in an unfolded state. A process from the folded state to the unfolded state is an unfolding process, and a process from the unfolded state to the folded state is a folding process.

In addition, it should be noted that, there may be one first housing 200 and one second housing 300, so that the foldable phone can be folded into two layers. Further, as shown in FIG. 1, the foldable phone may include only one first housing 200, one second housing 300, and a hinge mechanism 100 configured to connect the first housing 200 and the second housing 300. The first housing 200 and the second housing 300 relatively rotate to overlap with each other, so that the foldable electronic device is in a two-layer form.

Alternatively, there may be a plurality of first housings 200 and a plurality of second housings 300 (which are not shown), and a hinge mechanism 100 configured to connect a first housing 200 and a second housing 300 adjacent to each other exists between the first housing 200 and the second housing 300, so that the foldable electronic device can be folded into a plurality of layers. For example, the foldable electronic device may include two second housings 300, one first housing 200, and two hinge mechanisms 100 configured to connect the first housing 200 and the second housings 300. The two second housings 300 are located on two sides of the first housing 200, and are respectively rotatably connected to the first housing 200 by using the hinge mechanisms 100. One second housing 300 and the first housing 200 may relatively rotate to overlap with each other, and the other second housing 300 may also rotate relative to the first housing 200 to overlap with the first housing 200, so that the foldable electronic device is in a three-layer folded form. When two of the first housing 200 and the second housings 300 rotate to a same plane, the foldable electronic device is in an unfolded state.

Referring to FIG. 2, the foldable electronic device provided in this embodiment of this application may further include a flexible display 400, where the flexible display 400 may be disposed on surfaces of the hinge mechanism 100, the first housing 200, and the second housing 300. When the first housing 200 and the second housing 300 are folded, the flexible display 400 is bent and attached between the first housing 200 and the second housing 300. When the first housing 200 and the second housing 300 are unfolded, the flexible display 400 is correspondingly unfolded. In actual application, the flexible display 400 may be bonded to the surfaces of the hinge mechanism 100, the first housing 200, and the second housing 300, to ensure that at least a part of the flexible display 400 stably covers an inner side of the hinge mechanism 100, thereby improving stability of the flexible display 400 in the foldable electronic device.

Certainly, in some embodiments, the foldable electronic device may alternatively be a notebook computer. The notebook computer may also include a first housing 200 and a second housing 300. The first housing 200 and the second housing 300 can rotate close to each other to overlap with each other, so that the notebook computer is in a folded state. Otherwise, the first housing 200 and the second housing 300 rotate away from each other from a state in which the first housing 200 and the second housing 300 are overlapped with each other to a state in which the first housing 200 and the second housing 300 cannot rotate, so that the notebook computer is in an unfolded state. When the notebook computer is in the unfolded state, a part of a flexible display 400 on the first housing 200 may be used to display an image and the like, and a part of the flexible display 400 on the second housing 300 may be used as a virtual keyboard.

The following describes in detail the hinge mechanism 100 used in the foldable electronic device in this embodiment of this application.

Figure 3:
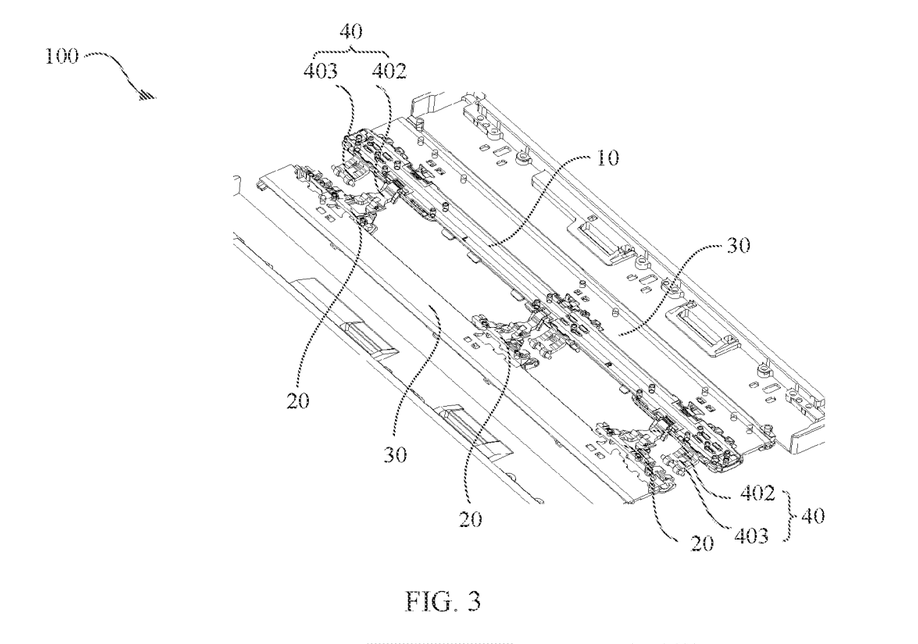
FIG. 3 is a schematic structural diagram of a hinge mechanism that is of a foldable electronic device and that is in an open state according to an embodiment of this application.

Referring to FIG. 3, the hinge mechanism 100 may include a base 10, and two mounting brackets 20, two support plates 30, and two linkage components 40 that are symmetrically disposed relative to the base 10. Each mounting bracket 20 is rotatably connected to the support plate 30 located on a same side, one end of each linkage component 40 is rotatably connected to the base 10, and the other end of the linkage component 40 is connected to the mounting bracket 20 located on a same side, so that the two mounting brackets 20 can be relatively folded and unfolded, so as to fold and unfold the foldable electronic device using the hinge mechanism 100.

Figure 4:
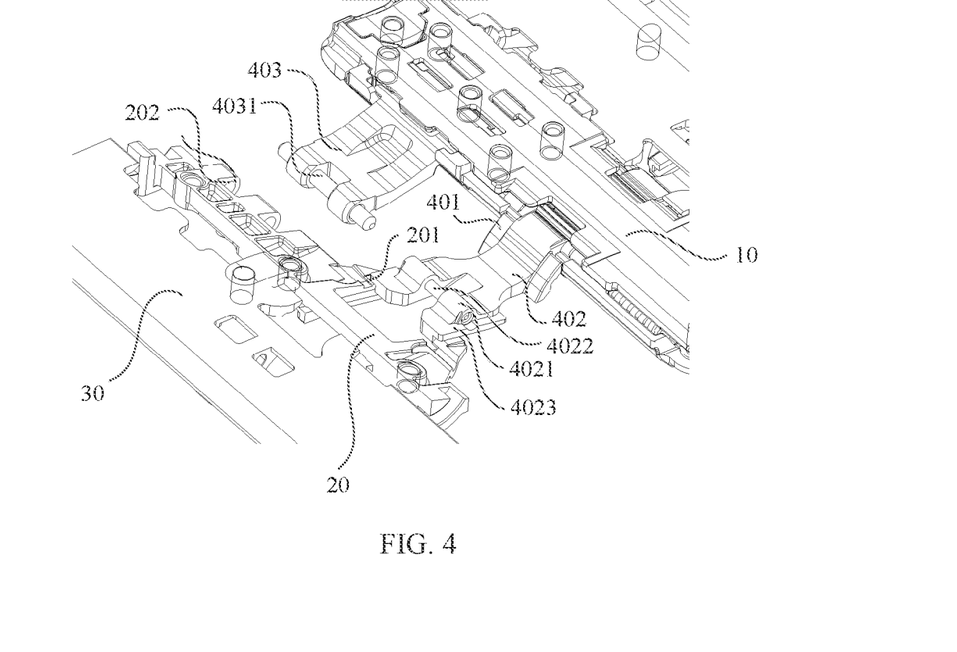
FIG. 4 is a schematic structural diagram of a part of the hinge mechanism of the foldable electronic device shown in FIG. 3.
Figure 5:
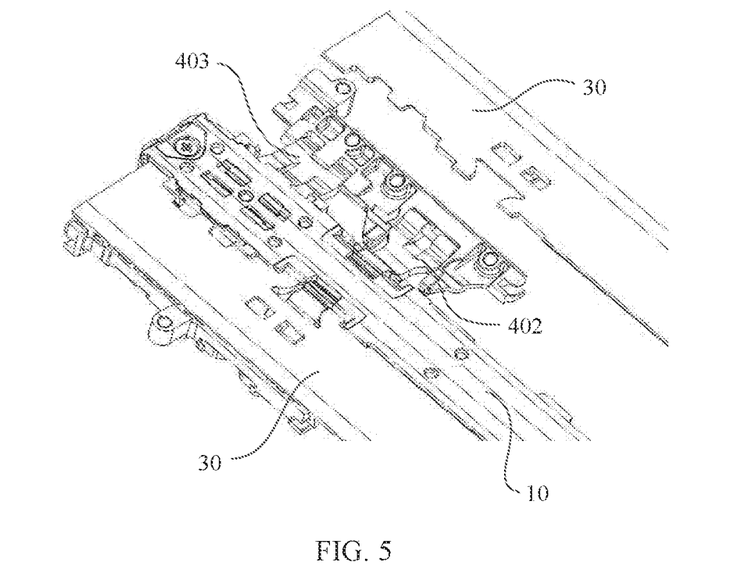
FIG. 5 is another schematic structural diagram of a part of the hinge mechanism of the foldable electronic device shown in FIG. 3.
Figure 6:
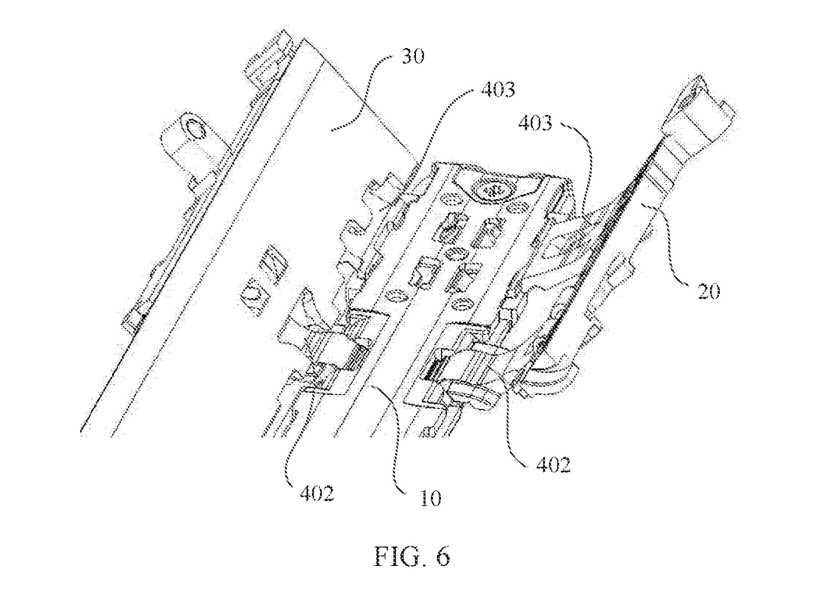
FIG. 6 is a schematic structural diagram of a hinge mechanism that is of a foldable electronic device and that is in a semi-folded state according to an embodiment of this application.
Figure 7:
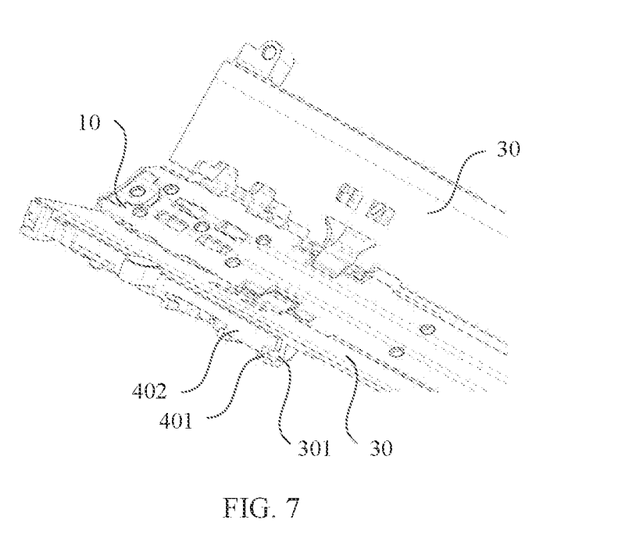
FIG. 7 is another schematic structural diagram of a hinge mechanism that is of a foldable electronic device and that is in a semi-folded state according to an embodiment of this application.
Figure 8:
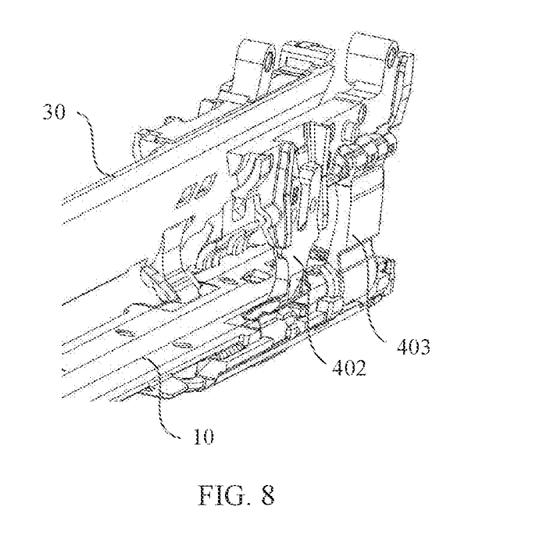
FIG. 8 is a schematic structural diagram of a hinge mechanism that is of a foldable electronic device and that is in a folded state according to an embodiment of this application.
Figure 9:
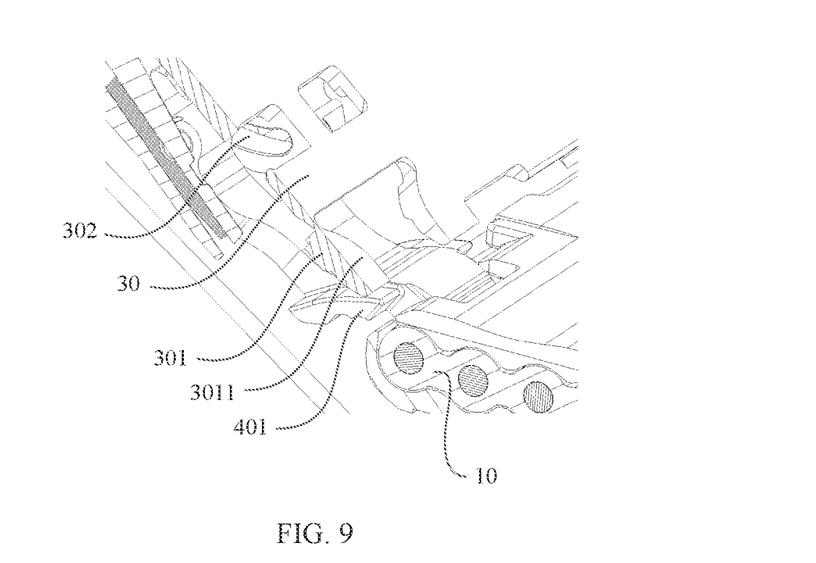
FIG. 9 is a schematic structural diagram of a support plate and a rotary slider that are of a hinge mechanism of a foldable electronic device and that are in a connected state according to an embodiment of this application.

In this embodiment of this application, as shown in FIG. 4, FIG. 7, and FIG. 9, a first lap joint structure 401 is disposed on one end that is of each linkage component 40 and that is rotatably connected to the base 10, and the first lap joint structure 401 extends in a direction from one end of the base 10 to the mounting bracket 20 located on a same side as the first lap joint structure 401, and a second lap joint structure 301 is disposed on one side that is of each support plate 30 and that faces the base 10, and the second lap joint structure 301 extends in a direction from the side of the support plate 30 to the base 10. In a process in which the foldable electronic device is folded or unfolded (to be specific, in a process in which the two mounting brackets 20 are relatively folded or unfolded), the second lap joint structure 301 slides along a surface of the first lap joint structure 401.

Further, the second lap joint structure 301 has a first surface 3011 (refer to FIG. 9) and a second surface (which is not shown in the figure) opposite to the first surface 3011, where the first surface 3011 is close to the flexible display 400. Further, the first surface 3011 is configured to support the flexible display 400, and the flexible display 400 may cover the first surface 3011. In the process in which the two mounting brackets 20 are relatively folded or unfolded, the second surface of the second lap joint structure 301 slides along the surface of the first lap joint structure 401.

It can be learned that the first lap joint structure 401 is disposed on one end that is of each linkage component 40 and that is rotatably connected to the base 10, and the first lap joint structure 401 extends in the direction from one end of the base 10 to the mounting bracket 20 located on the same side as the first lap joint structure 401, and the second lap joint structure 301 is disposed on one side that is of each support plate 30 and that faces the base 10, and the second lap joint structure 301 extends in the direction from the side of the support plate 30 to the base 10. As such, in the process in which the foldable electronic device is folded or unfolded (to be specific, in the process in which the two mounting brackets 20 are relatively folded or unfolded), the first lap joint structure 401 and the second lap joint structure 301 overlap with each other in upper and lower positions and surfaces of the first lap joint structure 401 and the second lap joint structure 301 are in contact with each other. In this case, the second lap joint structure 301 can slide along the surface of the first lap joint structure 401. In a process in which the hinge mechanism 100 is folded or unfolded, the surfaces of the first lap joint structure 401 and the second lap joint structure 301 are designed so that sliding tracks of the two support plates 30 can be precisely controlled, to prevent the support plates 30 from shaking in a motion process. In addition, in the conventional technology, to prevent the support plates 30 from being stuck in an unfolding process, a spacer between the support plate 30 and the base 10 is usually set to be large enough. In this application, in the process in which the hinge mechanism 100 is unfolded, the support plate 30 is also driven by the first lap joint structure 401 of the linkage component 40, to be raised based on a preset track until the support plate 30 is flush with a surface of the base 10. In this way, the support plate 30 will not be stuck due to a spacer of another part or the like, thereby avoiding a case that the support plate 30 cannot be raised to an open state.

Surface setting of the first lap joint structure 401 and the second lap joint structure 301 has the following three possible implementations.

In a possible implementation, the surface that is of the first lap joint structure 401 and that is in contact with the second lap joint structure 301 is an arc surface. The surface that is of the first lap joint structure 401 and that is in contact with the second lap joint structure 301 is disposed as an arc surface, so that the first lap joint structure 401 on the linkage component 40 and the second lap joint structure 301 on the support plate 30 can move more smoothly when contacting each other and relatively sliding.

In another possible implementation, the surface that is of the second lap joint structure 301 and that is in contact with the first lap joint structure 401 is an arc surface. The surface that is of the second lap joint structure 301 and that is in contact with the first lap joint structure 401 is disposed as an arc surface, so that the first lap joint structure 401 on the linkage component 40 and the second lap joint structure 301 on the support plate 30 can move more smoothly when contacting each other and relatively sliding.

In still another possible implementation, both the surface that is of the first lap joint structure 401 and that is in contact with the second lap joint structure 301 and the surface that is of the second lap joint structure 301 and that is in contact with the first lap joint structure 401 are arc surfaces. Both the surface that is of the first lap joint structure 401 and that is in contact with the second lap joint structure 301 and the surface that is of the second lap joint structure 301 and that is in contact with the first lap joint structure 401 are disposed as arc surfaces, so that the first lap joint structure 401 on the linkage component 40 and the second lap joint structure 301 on the support plate 30 can move more smoothly when contacting each other and relatively sliding.

Further, in some embodiments, the arc surface may have at least two segments of curved surfaces, and two adjacent segments of curved surfaces in the at least two segments of curved surfaces may be disposed at an included angle. For example, as shown in FIG. 9, the surface that is of the first lap joint structure 401 and that is in contact with the second lap joint structure 301 is an arc surface formed by splicing at least four segments of curved surfaces. Two adjacent segments of curved surfaces are not parallel to each other. In other words, there is an included angle between two adjacent segments of curved surfaces. The arc surface is disposed to have at least two segments of curved surfaces, and two adjacent segments of curved surfaces in the at least two segments of curved surfaces are disposed at an included angle, so that the support plate 30 can better adapt to a moving track of the second lap joint structure 301 when relatively sliding along the first lap joint structure 401.

It should be noted that, in this embodiment of this application, a size of the included angle formed between two adjacent segments of curved surfaces is not limited, and may be flexibly set based on a requirement in an actual application scenario, for example, an actual moving track.

In addition, the first lap joint structure 401 and the second lap joint structure 301 may be slidably overlapped with each other throughout an entire process, or may not be slidably overlapped with each other throughout an entire process but be slidably overlapped with each other in a portion of the process. If the first lap joint structure 401 and the second lap joint structure 301 are overlapped with each other in a portion of the process, relative slip on lapping path between any two positions can improve motion stability of the support plate 30 to some extent. That is, in a process in which the two mounting brackets 20 are relatively folded or unfolded from a first position to a second position, the second surface of the second lap joint structure 301 slides along the surface of the first lap joint structure 401. The first position and the second position may be any two positions in the process in which the two mounting brackets 20 are relatively folded or unfolded.

It should be noted that, specific positions of the first position and the second position and a motion path of relative sliding overlapping may be set based on a requirement in an actual application scenario, and are not limited in this embodiment of this application, provided that rotation stability of the hinge mechanism 100 can be improved in a sliding overlapping process.

Referring to FIG. 4 to FIG. 8, each linkage component 40 in this embodiment of this application may include a rotary slider 402 and an arc arm 403. One end of each rotary slider 402 is rotatably connected to the base 10, and the other end of the rotary slider 402 is slidably connected to the mounting bracket 20 located on a same side. One end of each arc arm 403 is rotatably connected to the base 10, and the other end of the arc arm 403 is rotatably connected to the mounting bracket 20 located on a same side. In addition, each support plate 30 is slidably connected to the rotary slider 402 or the arc arm 403.

It should be noted that, rotation axes of the rotary slider 402 and the arc arm 403 on the base 10 are parallel to but do not coincide with each other.

In this embodiment of this application, disposing manners of the first lap joint structure 401 on the linkage component 40 include but are not limited to the following several possible implementations:

In a possible implementation, the first lap joint structure 401 is disposed on one end that is of at least one rotary slider 402 and that is rotatably connected to the base 10. In this way, the second surface of the second lap joint structure 301 of the support plate 30 slides along the surface of the first lap joint structure 401 of the rotary slider 402.

In another possible implementation, the first lap joint structure 401 is disposed on one end that is of at least one arc arm 403 and that is rotatably connected to the base 10. In this way, the second surface of the second lap joint structure 301 of the support plate 30 slides along the surface of the first lap joint structure 401 of the arc arm 403.

In still another possible implementation, the first lap joint structure 401 is disposed on each of one end that is of at least one rotary slider 402 and that is rotatably connected to the base 10 and one end that is of at least one arc arm 403 and that is rotatably connected to the base 10. In this way, at least two second lap joint structures 301 may be disposed on the support plate 30, and second surfaces of the at least two second lap joint structures 301 may slide respectively along a surface of the first lap joint structure 401 of the rotary slider 402 and a surface of the first lap joint structure 401 of the arc arm 403.

One end of each rotary slider 402 is rotatably connected to the base 10, and the other end of the rotary slider 402 is slidably connected to the mounting bracket 20 located on the same side; one end of each arc arm 403 is rotatably connected to the base 10, and the other end of the arc arm 403 is rotatably connected to the mounting bracket 20 located on the same side, and each support plate 30 is slidably connected to the rotary slider 402 or the arc arm 403, so that the two mounting brackets 20 can be relatively folded and unfolded. In addition, the first lap joint structure 401 is disposed on the rotary slider 402, or the first lap joint structure 401 is disposed on the arc arm 403, or the first lap joint structure 401 is disposed on each of the rotary slider 402 and the arc arm 403, and the second lap joint structure 301 is disposed on one side that is of the support plate 30 and that faces the base 10. As such, in the process in which the foldable electronic device is folded, the second surface of the second lap joint structure 301 slides along the surface of the first lap joint structure 401. In this way, the second lap joint structure 301 and the first lap joint structure 401 relatively slide, thereby supporting the support plate 30 to slide and retract. In the process in which the hinge mechanism 100 is unfolded, the support plate 30 is raised, and the second lap joint structure 301 and the first lap joint structure 401 relatively slide and are gradually raised, until the hinge mechanism 100 is opened. Therefore, the foregoing mechanism can precisely control a moving track of the support plate 30, to prevent the hinge mechanism 100 from shaking in a motion process.

Figure 10:
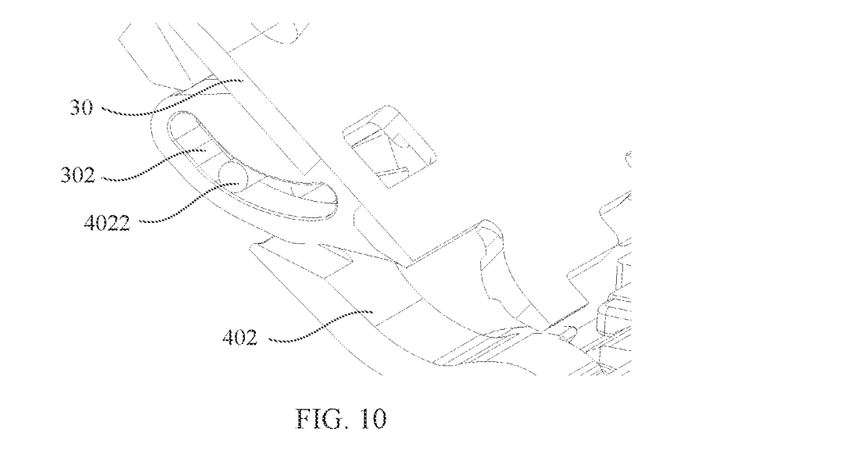
FIG. 10 is another schematic structural diagram of a support plate and a rotary slider that are of a hinge mechanism of a foldable electronic device and that are in a connected state according to an embodiment of this application.
Figure 11:
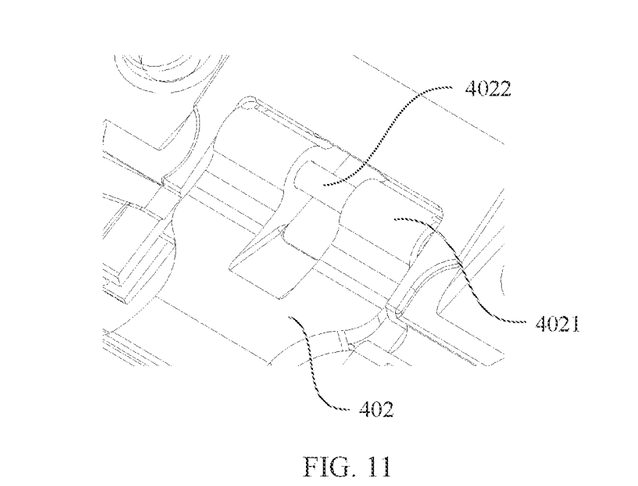
FIG. 11 is a schematic structural diagram of a part of a rotary slider of a hinge mechanism of a foldable electronic device according to an embodiment of this application.
Figure 13:
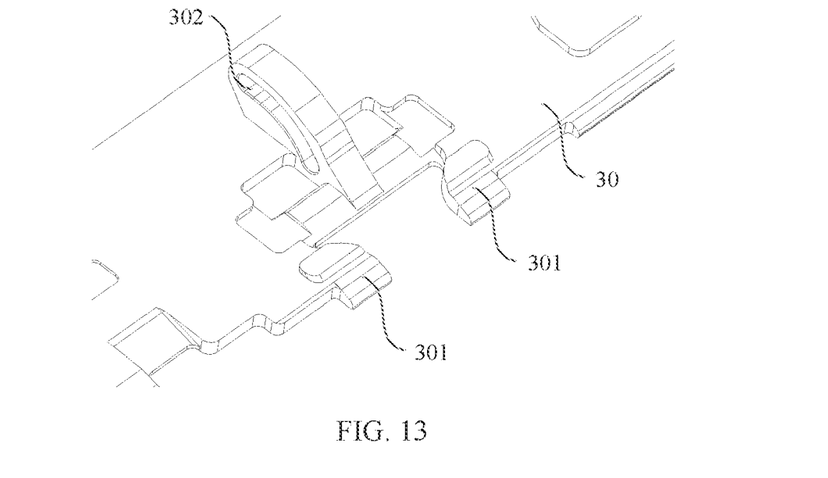
FIG. 13 is a schematic structural diagram of a part of the support plate in the hinge mechanism of the foldable electronic device shown in FIG. 12.

Further, in some embodiments, still referring to FIG. 9, FIG. 10, and FIG. 13, a chute 302 may be disposed on the support plate 30, a protrusion portion 4021 (refer to FIG. 4) may be disposed on one end that is of the rotary slider 402 and that faces the mounting bracket 20, a first hinge pin 4022 (refer to FIG. 11) may be disposed on the protrusion portion 4021, and the first hinge pin 4022 may run through the chute 302 and may relatively slide along an extension direction of the chute 302.

Alternatively, in some other embodiments, a chute 302 may be disposed on the support plate 30, a protrusion portion 4021 may be disposed on one end that is of the arc arm 403 and that faces the mounting bracket 20, a first hinge pin 4022 may be disposed on the protrusion portion 4021, and the first hinge pin 4022 may run through the chute 302 and may relatively slide along an extension direction of the chute 302.

In this way, a relative sliding connection between the rotary slider 402 or the arc arm 403 and the support plate 30 can be implemented, thereby ensuring that, in the process in which the foldable electronic device is folded, the first lap joint structure 401 on the rotary slider 402 or the arc arm 403 can abut against the second surface of the second lap joint structure 301 on the support plate 30 and the second surface of the second lap joint structure 301 can slide along the surface of the first lap joint structure 401. Therefore, the moving track of the support plate 30 can be precisely controlled, to prevent the hinge mechanism 100 from shaking in the motion process.

It is easy to understand that, in the conventional technology, when the first lap joint structure 401 and the second lap joint structure 301 are not disposed, one side of the support plate 30 is suspended, and there is an assembly gap between the first hinge pin 4022 and the chute 302 of the support plate 30. Consequently, the support plate 30 cannot be constrained in three directions. For example, when the support plate 30 is pressed in a vertical direction, the support plate 30 moves at a specific angle. However, in the hinge mechanism 100 provided in this embodiment of this application, when the support plate 30 is pressed, the second lap joint structure 301 on the support plate 30 is in contact with the first lap joint structure 401 on the rotary slider 402. When the support plate 30 rotates, a track of the support plate 30 can be precisely controlled, and the support plate 30 does not collapse in a folding process.

In an optional implementation, the chute 302 may be an arc-shaped chute. When being disposed as an arc-shaped chute, the chute 302 can fit a moving track existing when the second surface of the second lap joint structure 301 on the support plate 30 slides along the surface of the first lap joint structure 401 on the rotary slider 402 or the arc arm 403, thereby more precisely controlling the moving track of the support plate 30, to prevent the hinge mechanism 100 from shaking in the motion process.

It should be noted that, the second lap joint structure 301 extends (a specific extension length is controlled by the moving track of the support plate 30 and a moving track of the chute 302) relative to a length direction of the support plate 30. The rotary slider 402 or the arc arm 403 is similar to the support plate 30 in this aspect. At a position at which the rotary slider 402 or the arc arm 403 is overlapped with the second lap joint structure 301, one or more first lap joint structures 401 extend from the rotary slider 402 or the arc arm 403 to overlap with the second lap joint structure 301, and all surfaces that are of the second lap joint structures 301 and that abut against the first lap joint structures 401 may be arc surfaces. An overlapping length matches a width of the second lap joint structure 301, and a length of the second lap joint structure 301 may be slightly greater than a length of the first lap joint structure 401. A track line on the surface of the first lap joint structure 401 is determined by a moving track of the second lap joint structure 301. The track line may be in a multi-segment form, where all segments may be overlapped with the second lap joint structure 301, or some segments may be overlapped with the second lap joint structure 301 and some segments may be kept away from the second lap joint structure 301. This is not limited in this embodiment of this application, and may be further adjusted and optimized based on an actual requirement.

In addition, a groove 201 may be further disposed on one of the mounting bracket 20 and the rotary slider 402, and an extension portion 4023 may be disposed on the other one of the mounting bracket 20 and the rotary slider 402. As shown in FIG. 4, the groove 201 is disposed on the mounting bracket 20, and the extension portion 4023 is disposed on the rotary slider 402. In this way, the extension portion 4023 slides in the groove 201, and the extension portion 4023 can fit the groove 201 to implement a relative sliding connection between the mounting bracket 20 and the rotary slider 402.

In an optional implementation, a second hinge pin 4031 may be further disposed on one of the mounting bracket 20 and the arc arm 403, and a through-hole 202 may be further disposed on the other one of the mounting bracket 20 and the arc arm 403 for the second hinge pin 4031 to pass through. The second hinge pin 4031 passes through the through-hole 202, so that a relative rotating connection between the arc arm 403 and the mounting bracket 20 can be implemented. As shown in FIG. 4, the second hinge pin 4031 is disposed on the mounting bracket 20, and the through-hole 202 is disposed on the arc arm 403 for the second hinge pin 4031 to pass through. The second hinge pin 4031 on the arc arm 403 passes through the through-hole 202 on the mounting bracket 20, so that relative rotation may occur between the arc arm 403 and the mounting bracket 20. Therefore, relative motion between the rotary slider 402 and the mounting bracket 20 can be prevented from being affected.

Figure 12:
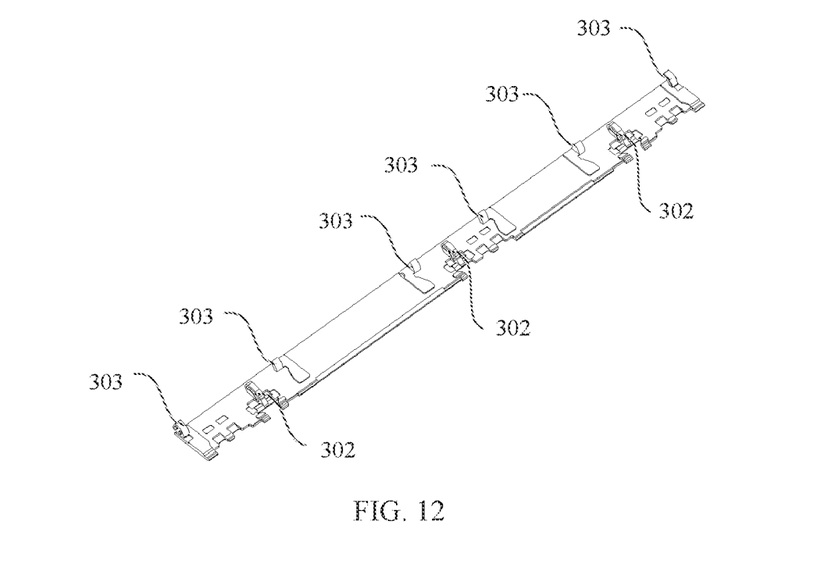
FIG. 12 is a schematic structural diagram of a support plate in a hinge mechanism of a foldable electronic device according to an embodiment of this application.
Figure 14:
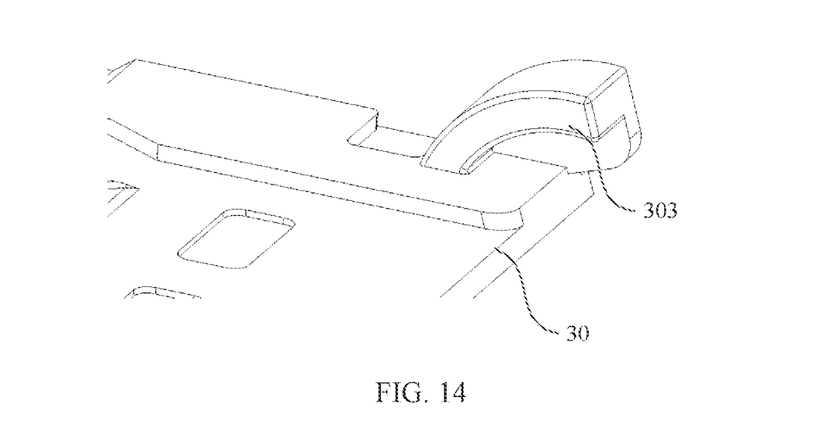
FIG. 14 is another schematic structural diagram of a part of the support plate in the hinge mechanism of the foldable electronic device shown in FIG. 12.
Figure 15:
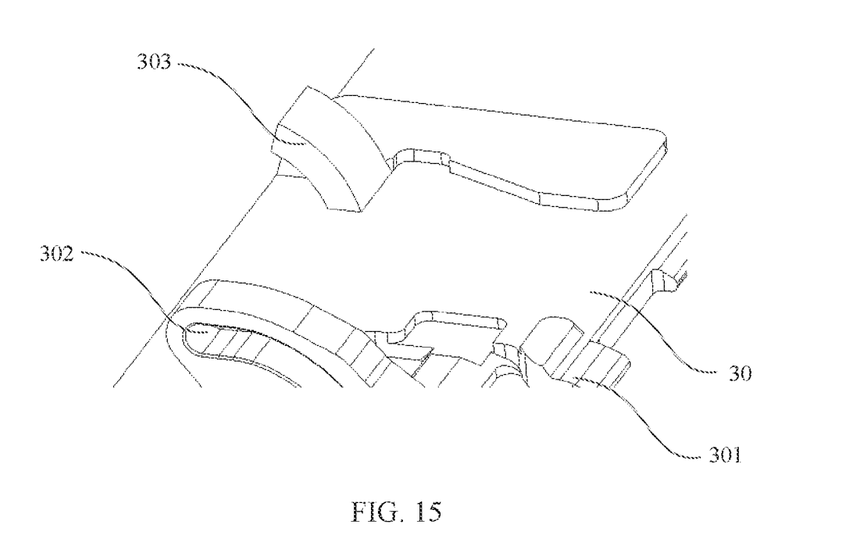
FIG. 15 is still another schematic structural diagram of a part of the support plate in the hinge mechanism of the foldable electronic device shown in FIG. 12.

In addition, referring to FIG. 12, FIG. 14, and FIG. 15, the support plate 30 may further have a circular arc bulge 303, and one side that is of the mounting bracket 20 and that faces the support plate 30 has a circular arc groove (which is not shown in the figure) that matches the circular arc bulge 303. In this way, the circular arc bulge 303 on the support plate 30 can relatively rotate around the circular arc groove on the mounting bracket 20, and connection stability between the rotary slider 402 and the mounting bracket 20 can be ensured to avoid relative shaking.

Further, in this embodiment of this application, the circular arc bulge 303 may be an axial center of an arc shown in FIG. 14 and FIG. 15. In a process in which the rotary slider 402 slides, the support plate 30 is pulled by the first hinge pin 4022 fastened onto the rotary slider 402 (the first hinge pin 4022 slides in the chute 302 of the support plate 30), so that the support plate 30 rotates around an axial center of an arc of the support plate 30, thereby implementing rotation motion of the support plate 30.

Figure 16:
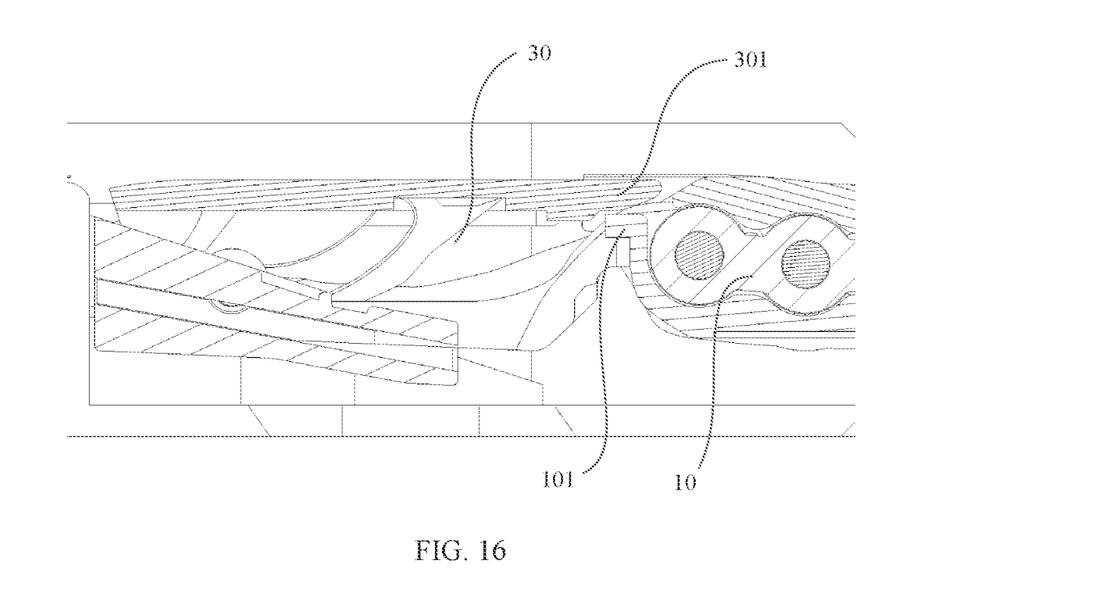
FIG. 16 is a schematic structural diagram of a support plate and a base when a hinge mechanism of a foldable electronic device is in an open state according to an embodiment of this application.

In addition to the foregoing design of the lap joint structures, in this embodiment of this application, as shown in FIG. 16, a third lap joint structure 101 may be further disposed on one side that is of the base 10 and that faces each support plate 30. When the foldable electronic device is in an open state, the second surface of the second lap joint structure 301 of each support plate 30 abuts against the third lap joint structure 101 located on a same side. The third lap joint structure 101 disposed on the side of the base 10 may more stably support the support plate 30 in the open state without causing shaking or collapse because of an excessively large gap between the support plate 30 and the base 10. In addition, the second lap joint structure 301 on the support plate 30 is overlapped with the third lap joint structure 101 on the base 10, so that extrusion force borne by the support plate 30 in a vertical direction can be transmitted to the base 10. Therefore, a problem that the support plate 30 is deformed due to the extrusion force can be alleviated, thereby improving an anti-extrusion capability of the hinge mechanism 100.

In addition, when the support plate 30 is in an unfolded state, the second lap joint structure 301 is overlapped with the third lap joint structure 101 of the base 10 by a width, so as to support the flexible display 400 of the foldable electronic device in the vertical direction. In this way, the flexible display 400 can bear extrusion force in the vertical direction, and a significant increase in an effective support area of the flexible display 400 can effectively reduce problems such as a pressing failure of the display when in use.

It may be understood that, when the support plate 30 is in the unfolded state, a height of the third lap joint structure 101 of the base 10 is lower than a height of the second lap joint structure 301 of the support plate 30. In other words, the second surface of the second lap joint structure 301 of the support plate 30 is overlapped with a surface of the third lap joint structure 101. In addition, an overlapping width between the third lap joint structure 101 and the second lap joint structure 301 matches the motion track of the second lap joint structure 301. In this embodiment of this application, the overlapping length between the second lap joint structure 301 and the third lap joint structure 101 is not limited, and may be flexibly set based on an application requirement in an actual scenario.

Further, when the third lap joint structure 101 is combined with the design of the first lap joint structure 401 and design of the second lap joint structure 301, and when the support plates 30 are relatively folded, because of the design of the first lap joint structure 401, the second lap joint structure 301 smoothly slides towards a direction far away from the base 10 without being stuck by the third lap joint structure 101. When the support plates 30 are relatively unfolded, because of the design of the first lap joint structure 401, the second lap joint structure 301 smoothly slides towards a direction close to the base 10 and is raised to be higher than a position of the third lap joint structure 101 without being stuck by the third lap joint structure 101.

Therefore, because of the linkage design of the three lap joint structures (the first lap joint structure 401, the second lap joint structure 301, and the third lap joint structure 101), the support plates 30 can be more smoothly and stably folded and unfolded. Therefore, the entire hinge mechanism 100 moves more stably and smoothly, thereby improving a use effect.

In addition, in this embodiment of this application, when the first housing 200 and the second housing 300 are completely closed together, the entire phone has an equal thickness. The base 10 plays a role of connection, and an appearance at the base 10 is a complete structure without a hole and a protrusion. In this way, when a hole area in a region of the base 10 is relatively small, an area supporting the flexible display 400 can be increased, thereby reducing a failure risk when the flexible display 400 is pressed.

In the descriptions of the embodiments of this application, it should be noted that, unless otherwise clearly stipulated and limited, the terms "installation", "linkage", and "connection" should be interpreted broadly, for example, may be a fixed connection, or may be an indirect connection by using an intermediate medium, and may be communication inside two elements or an interaction relationship between two elements. A person of ordinary skill in the art may understand specific meanings of the foregoing terms in the embodiments of this application based on a specific situation.

In the embodiments of this application or by implication, the referred apparatus or component needs to have a specific azimuth, be constructed and operated in a specific azimuth, and therefore cannot be understood as a limitation to the embodiments of this application. In the descriptions of the embodiments of this application, the meaning of "a plurality of" is two or more, unless otherwise precisely and further specified.

In the specification, claims, and accompanying drawings of the embodiments of this application, the terms "first", "second", "third", "fourth", and so on (if existent) are intended to distinguish between similar objects but do not necessarily indicate a specific order or sequence. It should be understood that the data termed in such a way is interchangeable in proper circumstances so that the embodiments of this application described herein can be implemented in an order other than the order illustrated or described herein. Moreover, the terms "include", "having" and any other variant thereof mean to cover the non-exclusive inclusion, for example, a process, method, system, product, or device that includes a list of steps or units is not necessarily limited to those steps or units, but may include other steps or units not expressly listed or inherent to such a process, method, product, or device.

Finally, it should be noted that the foregoing embodiments are merely intended for describing the technical solutions of the embodiments of this application rather than limiting this application. Although the embodiments of this application are described in detail with reference to the foregoing embodiments, persons of ordinary skill in the art should understand that they may still make modifications to the technical solutions described in the foregoing embodiments or make equivalent replacements to a part or all technical features thereof, without departing from the scope of the technical solutions of the embodiments of this application.

What is claimed is:

1. A hinge mechanism, comprising:
    a base;
    two mounting brackets, two support plates, and two linkage components that are symmetrically disposed relative to the base, wherein each mounting bracket is rotatably connected to one of the support plates located on a same side, wherein a first end of each linkage component is rotatably connected to the base, and wherein a second end of each linkage component is connected to one of the mounting brackets located on a same side to enable the two mounting brackets to be folded and unfolded;
    a first lap joint structure disposed on the first end and extending in a direction from a third end of the base to one of the mounting brackets located on a same side as of the first lap joint structure; and
    a second lap joint structure disposed on a side of each support plate that faces the base and extending in a direction from the side of each support plate to the base, wherein the second lap joint structure has a first surface and a second surface opposite to the first surface,
    wherein the second surface is configured to slide along a third surface of the first lap joint structure when the two mounting brackets are folded or unfolded.

2. The hinge mechanism of claim 1, further comprising a third lap joint structure disposed on one side of the base that faces each support plate, wherein the second surface is configured to abut against the third lap joint structure located on a same side when the two mounting brackets are unfolded into an open state.

3. The hinge mechanism of claim 1, wherein the third surface that is in contact with the second lap joint structure is a first arc surface, wherein the second surface is a second arc surface, or wherein both the third surface and the second surface are arc surfaces.

4. The hinge mechanism of claim 3, wherein the first or the second arc surface has at least two segments of curved surfaces, and wherein two adjacent segments in the at least two segments of curved surfaces are disposed at an included angle.

5. The hinge mechanism of claim 1, wherein the second surface is configured to slide along the third surface when the two mounting brackets are folded or unfolded from a first position to a second position, and wherein the first position and the second position are two positions of the two mounting brackets in a folding or unfolding process.

6. The hinge mechanism of claim 1, further comprising:
    a chute configured to dispose on one of the support plates;
    a protrusion portion configured to dispose on one of the linkage components; and
    a first hinge pin configured to dispose on the protrusion portion, to run through the chute, and slide along an extension direction of the chute.

7. The hinge mechanism of claim 1, wherein each linkage component comprises:
    a rotary slider comprising a fourth end configured to rotatably connect to the base and a fifth end configured to slidably connect to a first mounting bracket located on a same side; and
    an arc arm comprising a sixth end configured to rotatably connect to the base and a seventh end configured to rotatably connect to a second mounting bracket located on a same side,
    wherein each support plate is configured to slidably connect to the rotary slider or the arc arm,
    wherein rotation axes of the rotary slider and the arc arm on the base are parallel, and
    wherein the first lap joint structure is disposed on the fourth end, the sixth end, or the fourth end and the sixth end.

8. The hinge mechanism of claim 7, further comprising:
    a groove disposed on the first mounting bracket and the rotary slider; and
    an extension portion disposed on the second mounting bracket and the rotary slider and fitting the groove to implement a sliding connection between the first mounting bracket and the rotary slider.

9. The hinge mechanism of claim 1, wherein one of the support plates has a circular arc bulge, wherein one side of one of the mounting brackets that faces the one of the support plates has a circular arc groove that matches the circular arc bulge, and wherein the circular arc bulge rotates in the circular arc groove to implement a rotating connection between the one of the support plates and the mounting brackets.

10. A foldable electronic device, comprising:
    a hinge mechanism, comprising:
        a base;
        two mounting brackets, two support plates, and two linkage components that are symmetrically disposed relative to the base, wherein each mounting bracket is rotatably connected to one of the support plates located on a same side, wherein a first end of each linkage component is rotatably connected to the base, and a second end of the linkage component is connected to one of the mounting brackets located on a same side to enable the two mounting brackets to be folded and unfolded;
        a first lap joint structure disposed on the first end and extending in a direction from one end of the base to one of the mounting brackets located on a same side as the first lap joint structure;
        a second lap joint structure disposed on a side of each support plate that faces the base, and extending in a direction from the side of the support plate to the base, wherein the second lap joint structure has a first surface and a second surface opposite to the first surface,
        wherein the second surface is configured to slide along a third surface of the first lap joint structure when the two mounting brackets are folded or unfolded;
    a first housing and a second housing are respectively located on two sides of the hinge mechanism and fastened to the mounting brackets; and a flexible display configured to dispose on surfaces of the hinge mechanism, the first housing, and the second housing.

11. The foldable electronic device of claim 10, wherein the hinge mechanism further comprises a third lap joint structure disposed on one side of the base that faces each support plate, and wherein the second surface of each support plate is configured to abut against the third lap joint structure located on a same side when the two mounting brackets are unfolded into an open state.

12. The foldable electronic device of claim 10, wherein the third surface is an arc surface.

13. The foldable electronic device of claim 12, wherein the arc surface has at least two segments of curved surfaces, and wherein two adjacent segments in the at least two segments of curved surfaces are disposed at an included angle.

14. The foldable electronic device of claim 10, wherein the second surface is configured to slide along the third surface when the two mounting brackets are folded or unfolded from a first position to a second position, and wherein the first position and the second position are two positions of the two mounting brackets in a folding or unfolding process.

15. The foldable electronic device of claim 10, wherein the hinge mechanism further comprises:
   a chute configured to dispose on one of the support plates;
   a protrusion portion configured to dispose on one of the linkage components; and
   a first hinge pin configured to dispose on the protrusion portion, to run through the chute, and slide along an extension direction of the chute.

16. The foldable electronic device of claim 10, wherein each linkage component comprises:
   a rotary slider comprising a fourth end configured to rotatably connect to the base and a fifth end configured to slidably connect to a first mounting bracket located on a same side; and
   an arc arm comprising a sixth end rotatably connected to the base and a seventh end rotatably connected to a second mounting bracket located on a same side,
   wherein each support plate is configured to slidably connect to the rotary slider or the arc arm,
   wherein rotation axes of the rotary slider and the arc arm on the base are parallel, and
   wherein the first lap joint structure is disposed on the fourth end, the sixth end, or the fourth end and the sixth end.

17. The foldable electronic device of claim 16, wherein the hinge mechanism further comprises:
   a groove disposed on the first mounting bracket and the rotary slider; and
   an extension portion disposed on the second mounting bracket and the rotary slider and fitting the groove to implement a sliding connection between the first mounting bracket and the rotary slider.

18. The foldable electronic device of claim 10, wherein one of support plate further comprises a circular arc bulge, wherein one side of one of the mounting brackets that faces the one of the support plates has a circular arc groove that matches the circular arc bulge, and wherein the circular arc bulge rotates in the circular arc groove to implement a rotating connection between the one of the support plates and the mounting brackets.

19. The foldable electronic device of claim 10, wherein the second surface is an arc surface.

20. The foldable electronic device of claim 10, wherein both the third surface and the second surface are arc surfaces.

* * * * *